US007153332B2

(12) United States Patent
Hasemann

(10) Patent No.: US 7,153,332 B2
(45) Date of Patent: *Dec. 26, 2006

(54) USE OF A DYESTUFF FOR INK JET PRINTING RECORDING MATERIALS

(75) Inventor: Ludwig Hasemann, Müllheim-Niederweiler (DE)

(73) Assignee: Clariant Finance (BVI) Limited, Tortola (VG)

(*) Notice: Subject to any disclaimer, the term of this patent is extended or adjusted under 35 U.S.C. 154(b) by 0 days.

This patent is subject to a terminal disclaimer.

(21) Appl. No.: 10/498,856

(22) PCT Filed: Dec. 18, 2002

(86) PCT No.: PCT/IB02/05474

§ 371 (c)(1), (2), (4) Date: Jun. 14, 2004

(87) PCT Pub. No.: WO03/052007

PCT Pub. Date: Jun. 26, 2003

(65) Prior Publication Data

US 2005/0120495 A1 Jun. 9, 2005

(30) Foreign Application Priority Data

Dec. 19, 2001 (GB) ................................ 0130309.8
Nov. 7, 2002 (GB) ................................ 0225997.6

(51) Int. Cl.
*D06P 3/60* (2006.01)
*G03G 9/00* (2006.01)

(52) U.S. Cl. .................. 8/639; 430/108.23; 106/31.48

(58) Field of Classification Search .................. 430/45, 430/108.23; 106/31.48; 8/536, 639, 641
See application file for complete search history.

(56) References Cited

U.S. PATENT DOCUMENTS

| | | | | |
|---|---|---|---|---|
| 3,211,554 | A * | 10/1965 | Dreyfuss | 430/563 |
| 4,308,542 | A | 12/1981 | Maekawa et al. | |
| 4,626,284 | A | 12/1986 | Ohta et al. | |
| 4,703,113 | A | 10/1987 | Baxter et al. | |
| 4,849,770 | A | 7/1989 | Koike et al. | |
| 4,935,307 | A | 6/1990 | Iqbal et al. | |
| 4,956,230 | A | 9/1990 | Edwards et al. | |
| 4,963,189 | A | 10/1990 | Hindagolla | |
| 5,006,862 | A | 4/1991 | Adamic | |
| 5,134,198 | A | 7/1992 | Stofko, Jr. et al. | |
| 5,219,928 | A | 6/1993 | Stofko, Jr. et al. | |
| 5,227,477 | A | 7/1993 | Auerbach et al. | |
| 5,607,502 | A * | 3/1997 | Hassenruck et al. | 106/31.51 |
| 5,853,540 | A | 12/1998 | Niemoller et al. | |
| 6,548,647 | B1 | 4/2003 | Dietz et al. | |
| 6,844,428 | B1 * | 1/2005 | Hasemann et al. | 534/637 |
| 2002/0017218 | A1 | 2/2002 | Baettig et al. | |
| 2003/0060608 | A1 | 3/2003 | Hasemann et al. | |
| 2004/0083924 | A1 | 5/2004 | Oberholzer | |
| 2004/0111813 | A1 | 6/2004 | Hasemann | |
| 2004/0127693 | A1 | 7/2004 | Wald et al. | |

FOREIGN PATENT DOCUMENTS

| | | |
|---|---|---|
| DE | 30 18 342 | 11/1980 |
| DE | 39 18 653 | 12/1989 |
| DE | 44 46 551 | 12/1998 |
| EP | 0 164 196 | 12/1985 |
| EP | 0 425 150 | 5/1991 |
| EP | 0 713 903 | 5/1996 |
| EP | 0 755 332 | 1/1997 |
| EP | 0 875 393 | 11/1998 |
| EP | 1 160 291 | 12/2001 |
| GB | 1 372 448 | 10/1974 |
| GB | 1 566 804 | 5/1980 |
| GB | 2 184 742 | 7/1987 |
| GB | 2 219 804 | 12/1989 |
| GB | 2 330 556 | 4/1999 |
| WO | WO 98/53009 | 11/1998 |
| WO | WO 99/63005 | 12/1999 |
| WO | WO 0078876 | * 12/2000 |

OTHER PUBLICATIONS

P. Gregory "Topics in Applied Chemistry: High Technology Applications of Organic Colorants" Plenum Press, New York 1991, p. 15-25.
English abstract for EP 0713903, May 29, 1996.
R.W. Kenyon, "Chemistry and Technology of Printing and Imaging Systems", Peter Gregory, Blackie Academic & Professional, Chapmann & Hall 1996, pp. 113-138.
USPTO Office Action for U.S. Appl. No. 10/221, 981, mailed Jan. 14, 2004.
PCT Search Report for application No. PCT/IB 02/05474, mail dated Feb. 24, 2003.
PCT International Preliminary Examination Report for application No. PCT/IB 02/05474, mail dated Jan. 22, 2004.

* cited by examiner

*Primary Examiner*—John L Goodrow
(74) *Attorney, Agent, or Firm*—Tod A. Waldrop

(57) ABSTRACT

Disclosed are dyestuff mixtures for printing recording materials, especially textile fibre materials, paper and papery substrates and plastic films and plastic, as well as compositions suitable for ink-jet printing comprising a dyestuff of the formula (I)

(I)

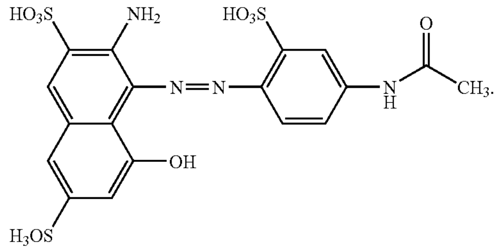

15 Claims, No Drawings

USE OF A DYESTUFF FOR INK JET PRINTING RECORDING MATERIALS

The invention relates to novel dyestuff mixtures, the use of such mixtures for printing recording materials, especially paper or papery substrates, textile fibre materials, plastic films and plastic transparencies by the inkjet printing process and also to the recording materials printed thereby.

Inkjet printing processes are becoming more and more important for industrial applications.

Inkjet printing processes are known. In what follows, the principle of inkjet printing will only be discussed very briefly. Details of this technology are described for example in the Ink-Jet-Printing section of R. W. Kenyon in "Chemistry and Technology of Printing and Imaging Systems", Peter Gregory (editor), Blackie Academic & Professional, Chapmann & Hall 1996, pages 113–138, and references cited therein.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

By additionally disposing at least one nozzle with yellow, magenta or cyan ink side by side it is possible to obtain colour reproductions in high quality. This process is known as polychromatic printing or, when three colour components are used, as trichromatic printing.

The composition of the invention can be used with all known and suitable inkjet printers for printing paper or papery substrates, textile fibre materials, plastic films and plastic transparencies. This applies not only to the use in monochromatic printing but also to polychromatic printing, especially trichromatic printing.

The composition of the ink for the inkjet printing process has to possess a suitable conductivity, sterility in storage, viscosity and surface tension to meet the specific requirements of inkjet ink. In addition, the prints on the recording materials have to have good properties and fastness.

Useful recording materials, as mentioned above, are preferably paper and papery substrates, textile fibre materials, plastic films and plastic transparencies. But glass and metal may be used as well.

Useful papers or papery substrates include all known such materials. Preference is given to papers or papery substrates coated on at least one side with a material which is particularly receptive to ink compositions. Such papers or papery materials are described inter alia in DE 3018342, DE 4446551, EP 164196 and EP 875393.

Useful textile fibre materials are in particular hydroxyl-containing fibre materials. Preference is given to cellulosic fibre materials, which consist of or comprise cellulose. Examples are natural fibre materials such as cotton, linen or hemp and regenerated fibre materials such as, for example, viscose and also lyocell.

Useful plastic films or plastic transparencies include all known such materials. Preference is given to plastic films or plastic transparencies coated on at least one side with a material which is particularly receptive to the ink compositions. Such plastic films or plastic transparencies are described inter alia in EP 755332, U.S. Pat. No. 4,935,307, U.S. Pat. No. 4,956,320, U.S. Pat. No. 5,134,198 and U.S. Pat. No. 5,219,928.

This invention provides a inkjet printing composition for printing recording materials by comprising 1) the dye of formula (I)

(I)

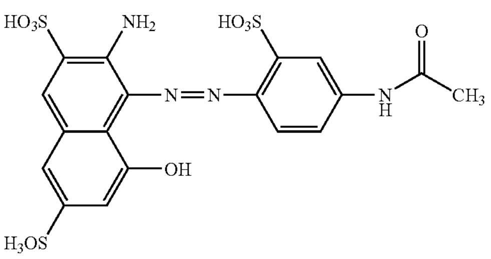

and 2) water or a medium including a mixture of water and an organic solvent, an anhydrous organic solvent or a solid having a low melting point, There may be optionally further additives be present in the composition according to the invention as described below.

The invention further provides the use of a compound of formula (I)

(I)

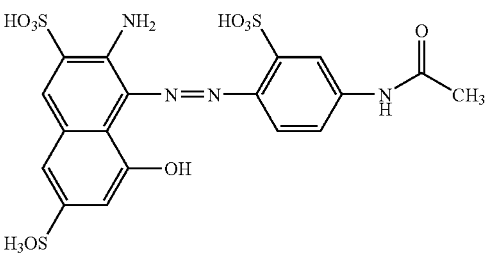

for ink jet printing or the use of a compound of formula (I) in ink jet printing compositions. The invention further provides the use of a compound of formula (I) for ink jet printing or for electrophotographic printing. The invention further provides toners for electrophotographic printing comprising a compound of formula (I).

This invention further provides dyestuff mixtures comprising at least compound of formula (I)

(I)

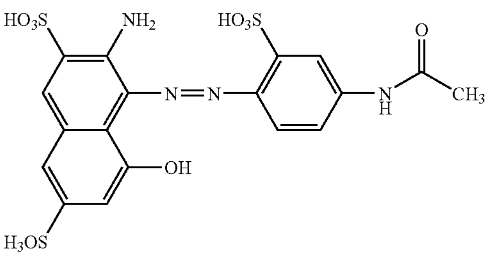

as free acid or in salt form and at least one compound according to formula (II) and/or formula (III) and/or formula (IV) and/or formula (V) wherein the compounds of formulas (II) signifies

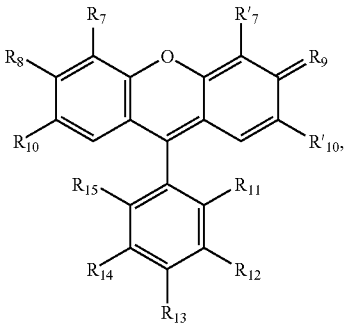

(II)

wherein $R_7$ and $R'_7$ signify independently from each other H or halogen, $R_8$ signifies —OH or $NR_{16}R_{17}$, wherein $R_{16}$ signifies H; unsubstituted $C_{1-4}$alkyl; substituted $C_{1-4}$alkyl; unsubstituted phenyl or a substituted phenyl, $R_{17}$ signifies unsubstituted $C_{1-4}$alkyl; substituted $C_{1-4}$alkyl; unsubstituted phenyl or a substituted phenyl, $R_9$ signifies O or $NR_{17}$, wherein $R_{17}$ has the same meanings as defined above, $R_{10}$ and $R'_{10}$ signify independently from each other H; halogen; unsubstituted $C_{1-2}$alkyl or $—NO_2$, $R_{11}$ signifies $—SO_3H$ or —COOH, $R_{12}$ signifies H or halogen, $R_{13}$ signifies H; $—SO_3H$ or halogen $R_{14}$ signifies H or halogen, $R_{15}$ signifies H or halogen, wherein the compounds of formulas (III) signifies

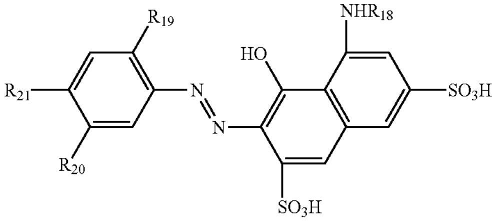

(III)

wherein $R_{18}$ signifies H;

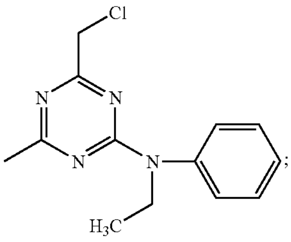

;

$—COC_{1-2}$alkyl; $—CO(CH_2O)_n—R_{22}$; $—SO_2R_{22}$, wherein $R_{22}$ signifies an unsubstituted phenyl or a phenyl moiety, which is substituted by at least one substituent of the group consisting of $—CH_3$ or halogen, n is 0 or 1, $R_{19}$ signifies H; $—CH_3$; $—SO_3H$ or $—OR_{23}$, wherein $R_{23}$ signifies $—CH_3$; unsubstituted phenyl; substituted phenyl or benzyl $R_{20}$ signifies H; halogen; $C_{1-10}$alkyl or $—NHCOCHBrCH_2Br$ $R_{21}$ signifies H; $—NO_2$; $C_{1-15}$alkyl or $C_{5-7}$cycloalkyl;

wherein the compounds of formulas (IV) signifies (IV)

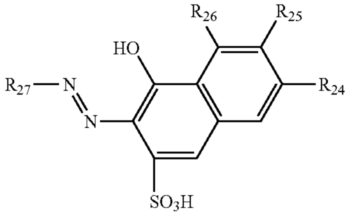

wherein $R_{24}$ signifies H or $—SO_3H$, $R_{25}$ signifies H; $—NHCOC_{1-2}$alkyl or —OH, $R_{26}$ signifies H or —OH;

$R_{27}$ signifies

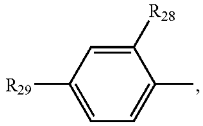

, wherein $R_{28}$ signifies H or unsubstituted phenyl, $R_{29}$ signifies H; —COH; $—NO_2$;

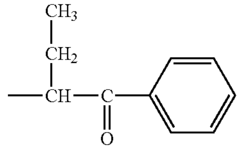

or

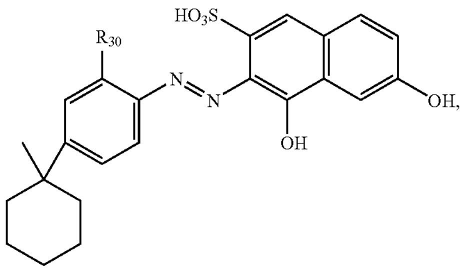

, wherein $R_{30}$ is H or —$CH_3$, or $R_{27}$ signifies

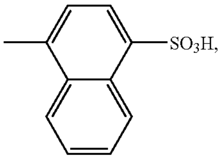

wherein the compounds of formulas (V) signifies (V)

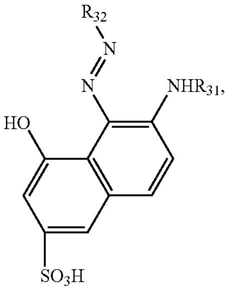

wherein $R_{31}$ signifies H or

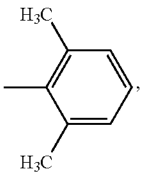

$R_{32}$ signifies

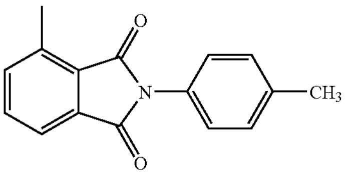

or

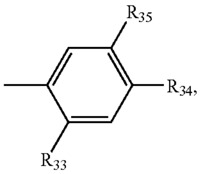

wherein $R_{33}$ signifies H; —$SO_3H$; —$CF_3$; —Cl; —$COOC_{1-2}$alkyl; —$SO_2R_{36}$, wherein $R_{36}$ signifies unsubstituted phenyl; substituted phenyl; O-phenyl; —NH—$C_{1-12}$alkyl; —$N(C_{1-6}alkyl)_2$; unsubstituted $C_{5-8}$cycloalkyl; substituted $C_{5-8}$cycloalkyl; $C_{5-8}$cycloalkyl with at least one N, O or S atom incorporated into the ring;

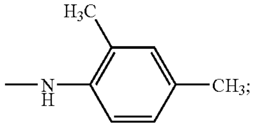

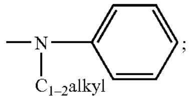

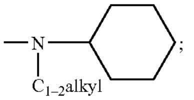

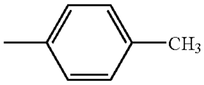

or

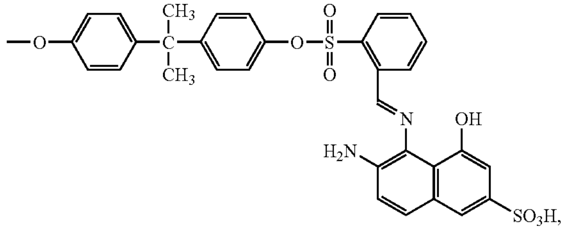

$R_{34}$ signifies H; —$NHCOC_{1-4}$alkyl; —NHCOphenyl, wherein the phenyl ring can be unsubstituted or substituted; —$N(C_{1-2}alkyl)COC_{1-4}$alkyl; —$N(C_{1-2}$alkyl)COphenyl, wherein the phenyl ring can be unsubstituted or substituted; unsubstituted phenyl; substituted phenyl; O-phenyl, wherein the phenyl can be unsubstituted or substituted; halogen; —$SO_3H$; —$NHCOOC_{1-2}$alkyl; —$NHCOOC_{5-7}$cycloalkyl, wherein the cycloalkyl can be substituted or unsubstituted and —$SO_2$NHphenyl, wherein the phenyl ring can be unsubstituted or substituted, $R_{35}$ signifies H; —$NHCOC_{1-4}$alkyl; —NHCOphenyl, wherein the phenyl ring can be unsubstituted or substituted; —$N(C_{1-2}alkyl)COC_{1-4}$alkyl; —$N(C_{1-2}$alkyl)COphenyl, wherein the phenyl ring can be unsubstituted or substituted; unsubstituted phenyl; substituted phenyl; O-phenyl, wherein the phenyl can be unsubstituted or substituted; halogen; —Cl; —$CH_3$; —$COOC_{1-4}$alkyl and —$SO_2$NHphenyl, wherein the phenyl ring can be unsubstituted or substituted.

Any alkyl or alkylene group may be linear or branched.

Useful cations for salt formation include in particular alkali metal, alkaline earth metal as well ammonium cations. Examples of such cations are alkali metal cations, for example potassium, lithium or sodium ions and ammonium cations, e.g. mono-, di-, tri- or tetra-methyl ammonium cations or mono-, di-, tri- or tetra-ethyl ammonium cations or mono-, di- or tri-ethanol ammonium cations. The cations may be the same or different, i.e. the compounds may be in mixed salt-form.

Preferred compounds according to formula (II) are C.I. (Colour Index) Acid Red 50, C.I. Acid Red 51, C.I. Acid Red 52, C.I. Acid Red 87, C.I. Acid Red 91, C.I. Acid Red 92, C.I. Acid Red 93, C.I. Acid Red 94, C.I. Acid Red 95, C.I. Acid Red 98, C.I. Acid Red 289, C.I. Acid Violet 9 or C.I. Acid Violet 30 and preferred compounds according to formula (III) are C.I. Acid Red 1, C.I. Acid Red 33, C.I. Acid Red 35, C.I. Acid Red 40, C.I. Acid Red 76, C.I. Acid Red 106, C.I. Acid Red 138, C.I. Acid Red 155, C.I. Acid Red 160, C.I. Acid Red 172, C.I. Acid Red 249, C.I. Acid Red 264 or C.I. Acid Red 265, and preferred compounds according to formula (IV) are C.I. Acid Red 15, C.I. Acid Red 19, C.I. Acid Red 29, C.I. Acid Red 60, C.I. Acid Red 68, C.I. Acid Red 154 or C.I. Acid Red 176 and preferred compounds according to formula (V) are C.I. Acid Red 30, C.I. Acid Red 34, C.I. Acid Red 37, C.I. Acid Red 42, C.I. Acid Red 54, C.I. Acid Red 57, C.I. Acid Red 231, C.I. Acid Red 266, C.I. Acid Red 301 or C.I. Acid Red 337

Especially preferred mixture comprises a compound according to formula (Ie) and C.I. Acid Red 52 and/or C.I. Acid Red 289 which have the following formulae

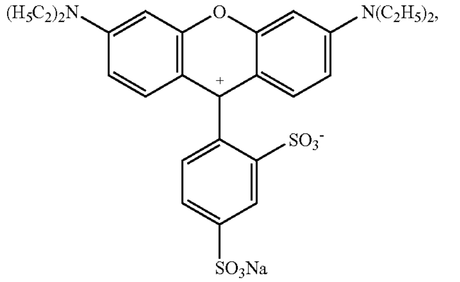

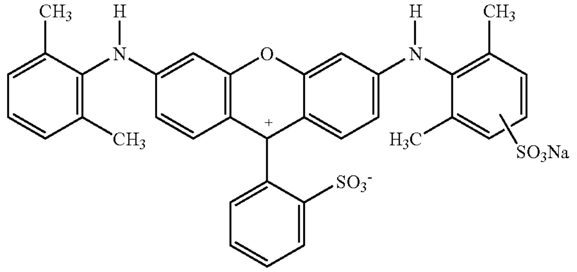

respectively.

It is possible to use the dyestuff (I) without any further dyestuff in the composition Ink jet printing compositions according the present invention.

A further embodiment of the present invention relates to a composition for printing recording materials, preferably paper and papery substrates, textile fibre materials, plastic films and plastic transparencies by the inkjet printing process, comprising 1) the dye of the formula (I) as defined above and
2) water or a medium including a mixture of water and an organic solvent, an anhydrous organic solvent or a solid having a low melting point, The inkjet printing composition may optionally comprise further additives.

A further embodiment of the present invention relates to a inkjet printing composition for printing recording materials, preferably paper and papery substrates, textile fibre materials, plastic films and plastic transparencies, comprising 1) a mixture of dyestuffs as defined above and
2) water or a medium including a mixture of water and an organic solvent, an anhydrous organic solvent or a solid having a low melting point, The inkjet printing composition may optionally comprise further additives.

When dyestuff mixture are used a dyestuff mixture according to the present invention preferably comprises 50–99 wt-% of at least one compound according to formula (I) and 1–50 wt-% of at least one compound according to formula (II) and/or at least one compound according to formula (III) and/or at least one compound according to formula (IV) and/or at least one compound according to formula (V).

The weight percentages are related to the total amount of dyestuff and wherein the sum of the weight percentages is always 100.

A further embodiment of the invention relates to the use of the above mentioned compositions for the ink-jet printing process.

The dyes of the formula (I), (II), (III), (IV) and/or (V) in the used in the inks should preferably be low in salt, i.e. have a total salt content of less than 0.5% by weight, based on the weight of the dyes. Dyes having higher salt contents (owing to their preparation and/or the subsequent addition of extenders) may be desalted, for example by means of membrane separation processes, such as ultrafiltration, reverse osmosis or dialysis.

The inks preferably include a total amount of dyes which is in the range from 0.5 to 35% by weight, preferably in the range from 1 to 35% by weight, more preferably in the range from 2 to 30% by weight, most preferably in the range from 2.5 to 20% by weight, based on the total weight of the ink.

The inks include 99.5–65% by weight, preferably 99–65% by weight, more preferably 98–70% by weight, most preferably 97.5–80% by weight, of an above-mentioned medium 2), which includes a mixture of water and an organic solvent, an anhydrous organic solvent or a solid having a low melting point.

When said medium 2) is a mixture including water and an organic solvent or an anhydrous organic solvent, the dye mixtures comprising at least one compounds of formula (I) and at least one compound of formula (II) and/or at least one compounds of formula (III) and/or at least one compound of formula (IV) and/or at least one compound of formula (V) are preferably completely dissolved in this medium.

Preferably the dye mixtures comprising at least one compounds of formula (I) and at least one compound of formula (II) and/or at least one compounds of formula (III) and/or at least one compound of formula (IV) and/or at least one compound of formula (V) as well as the new compounds according to formula (I) have a solubility of not less than 2.5% by weight in this medium 2) at 20° C.

When the ink composition of the invention is used for printing paper or papery substrates, the inks are preferably used together with the following compositions. When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20.

It is preferable for the organic solvent, which is included in the mixture with water to be a water-soluble solvent or a mixture of various water-soluble solvents. Preferred water-soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide, or dimethylacetamide; ketones and keto alcohols, preferably acetone, methyl ethyl ketone, cyclohexanone and diacetone alcohol; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol and thiodiglycol and oligo- and poly-alkylene glycols, preferably diethylene glycol, triethylene glycol, 1,2-propylenglycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy)ethanol, 2-[2-(2-methoxyethoxy) ethoxy]-ethanol, 2-[2-(2-ethoxyethoxy)ethoxy]ethanol, diethylenglycol-mono-n-butylether, ethylene glycol monoallyl ether and polyoxyethylenalkylether (for example Emulgen 66 of KAO Corp. (Emulgen is a trade mark of the Kao Corp.)); alkanolamines, preferably 2-diethylamine-1-ethanol, 3-dimethylamine-1-propanol, 3-diethylamine-1-propanol, 2-(2-aminoethoxy)ethanol, 2-(2-dimethylamino-ethoxy)-ethanol, 2-(2-diethylaminoethoxy)ethanol, mono-, di-, triethanolamine, monoglycolamines and polyglycolamines, which may be obtained by reaction of ammonia, alkyl- or hydroxyalkylamines like methylamine, ethylamine, dimethylaamine, diethylamine, mono-, di- and triethanolamines with alkyleneoxides for example ethylenoxide, 1,2-propylenoxide, 1,2-butylenoxide or 2,3-butylenoxide in suitable ratios as described in DE2061760A, preferably diethylenglycolamine, triethylenglycolamin, Bis-diethylenglycolamin, polyoxyethylen-(6)-triethanolamine, polyoxyethylen-(9)-triethanolamine, o-(2-aminoethyl)-polyethylenglycol 750, o,o-Bis-(2-aminopropyl)-polyethylenglycol 500, 800, 1900, 2000, o,o'-Bis-(3-aminopropyl)-polyethylenglycol 1500, cyclic amides, preferably 2-pyrrolidone, N-methyl-2-pyrrolidone, N-ethyl-2-pyrrolidone, N-(2-hydroxy)ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per 2) includes water and at least 2 or more, more preferably 2 to 8, water-soluble organic solvents.

Particularly preferred water-soluble solvents are cyclic amides, particularly 2-pyrrolidone, N-methyl-2-pyrrolidone and N-ethyl-2-pyrrolidone; N-(2-hydroxy)ethyl-2-pyrrolidone, $C_{1-6}$-alcohols, preferably n-propanol, cyclohexanol, diols, preferably 1,5-pentanediol, ethylene glycol, thiodiglycol, diethylene glycol, triethylene glycol and 1,2-propyleneglycol, triols, preferably glycerol; and mono-$C_{1-4}$-alkyl and $C_{1-4}$-alkyl ethers of diols, more preferably mono-$C_{1-4}$-alkyl ethers of diols possessing 2 to 12 carbon atoms, particularly preferably 2-[2-(2-methoxyethoxy)-ethoxy]-ethanol, diethylenglycol-mono-n-butylether, (for example Emulgen 66 of KAO Corp. (Emulgen is a trade mark of the Kao Corp.)), 2-diethylamine-1-ethanol, 3-dimethylamine-1-propanol, 3-diethylamine-1-propanol, 2-(2-diethylaminoethoxy)-ethanol, triethanolamine, diethylenglycolamin, polyglycolamines, preferably polyoyxethylen-(6)-triethanolamin, polyoxyethylen-(9)-triethanolamine, o-(2-aminoethyl)-polyethylen 750, o,o-bis-(2-aminopropyl)-poyethylen 500 and o,o-bis-(3-aminopropyl)-polyethylenglycol 1500.

A preferred medium as per 2) comprises (a) 75 to 95 parts by weight of water and (b) 25 to 5 parts of one or more of the watersoluble solvents.

wherein the parts are by weight and all parts of (a) and (b) add up to 100.

Examples of further useful ink compositions including water and one or more organic solvents are found in the Patent Specifications U.S. Pat. No. 4,963,189, U.S. Pat. No. 4,703,113, U.S. Pat. No. 4,626,284 and EP 425150A.

When the medium as per 2) includes an anhydrous (i.e. less than 1% by weight of water) organic solvent, this solvent will have a boiling point of 30 to 200° C., more preferably of 40–150° C., particularly preferably of 50–125° C.

The organic solvent can be water-insoluble, water-soluble or mixtures of such solvents.

Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$; and ethers, preferably diethyl ether; and mixtures thereof.

When the liquid medium as per 2) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per 2) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 125° C. Useful low-melting solids include long-chain fatty acids or alcohols, preferably those having a $C_{18-24}$-carbon chain, and sulphonamides.

The ink composition of the invention may further include as auxiliaries additional components which are normally used in inkjet inks, for example viscosity improvers, surface tension improvers, biocides, corrosion inhibitors, levelling agents, drying agents, humefactants, ink penetration additives, light stabilizers, UV absorbers, optical brighteners, coagulation reducers, ionic or nonionic surfactants, conducting salts and pH buffers.

These auxiliaries are preferably added in an amount of 0–5% by weight.

To prevent precipitation in the ink compositions of the invention, the dyes used have to be purified clean. This can be done with commonly known purifying methods.

When printing textile fibre materials, useful additives, as well as the solvents, include water-soluble nonionic cellulose ethers or alginates.

The preferred material is paper. The paper may be plain or treated.

Preference is given to ink compositions having a viscosity of 1 to 40 mPa·s, especially 5 to 40 mPa·s, preferably 10 to 40 mPa·s. Ink compositions having a viscosity of 10 to 35 mPa·s are particularly preferred.

Preference is given to ink compositions having a surface tension of 15–73 mN/m, especially 20–65 mN/m, particularly preferably 30–50 mN/m.

Preference is given to ink compositions having a conductivity of 0.1–100 mS/cm, especially 0.5–70 mS/cm, particularly preferably 1.0–60 mS/cm.

The inks may further include buffer substances, for example borax, borate or citrate. Examples are sodium borate, sodium tetraborate and sodium citrate.

They are used in particular in amounts of 0.1 to 3% by weight, preferably 0.1 to 1% by weight, based on the total weight of the ink, to set a pH of for example 5 to 9, especially 6 to 8. A citrate buffer is preferred in the case of alginatic inks.

The inks may further include customary additives, for example foam suppressants or especially fungal and/or bacterial growth inhibitors. These are customarily used in amounts of 0.01 to 1% by weight, based on the total weight of the ink.

The printing inks and also the dye mixtures comprising comprising at least the compound of formula (I) and at least one further compound selected from the compounds of formula (II), (III), (IV) and/or (V).

The prints obtainable by the process of the invention have good general fastnesses, a good lightfastness and also sharp contours and a high colour strength. The inks provide prints of high optical density.

The printing inks used are notable for good stability and good viscosity properties. The recording fluids of the invention have viscosity and surface tension values which are within the ranges suitable for the ink-jet processes. The viscosity remains virtually unchanged even in the event of high shearing forces occurring during printing.

Recording fluids according to the invention in storage are not prone to the formation of precipitates that leads to fuzzy prints or nozzle cloggage.

A further aspect of the present invention is the use of the printing ink in trichromatic printing. Trichromatic printing is a very large application for all recording materials. This form of printing is normally carried out with a yellow, red and blue ink composition. Furthermore, the magenta dye mixtures of the invention may be used as an ink set in combination with black, yellow and/or cyan recording fluids.

The dyestuff mixtures according to the invention may be used for shading other dystuffs or dyestuff mixtures. While the mixtures according to the invention itself may be blended with other compabibles dyestuff mixtures to achieve the desired shade. Instead of blending the dystuff mixtures it is also possible to mix inks of different shades to achieve the desired colour.

For example the shading colorant may be selected (among others) from the group consisting of C.I. Direct Red 1, 11, 37, 62, 75, 81, 87, 89, 95, 227; C.I. Acid Red 115, 131, 144, 152, 186, 245, C.I. Pigment Red 122, 176, 184, 185 and 269. The shading colorants are present in an amount of 0.001 to 5% by weight, preferably 0.01 to 1% by weight, based on the total weight of the dry dye mixture.

This invention further provides recording materials, which have been printed with a composition according to the invention.

Moreover, the dye mixtures of the invention are useful as colorants in the electrophotographic toners and developers, for example one- and two-component powder toners, magnetic toners, liquid toners, polymerization toners and other specialty toners.

Typical toner binders are addition polymerization, polyaddition and polycondensation resins, such as styrene, styrene-acrylate, styrene-butadiene, acrylate, polyester, phenolic and epoxy resins, polysulfones, polyurethanes, individually or in combination, and also polyethylene and polypropylene, in or to which further ingredients, such as charge control agents, waxes or flow agents, may be present or added subsequently. Dye mixtures according to the invention are further useful as colorants in powders and powder coating materials, especially triboelectrically or electrostatically sprayed powder coating materials, which are used to coat the surfaces of articles made for example of metal, wood, plastic, glass, ceramic, concrete, textile material, paper or rubber. Powder coating resins employed are typically epoxy resins, carboxyl- and hydroxyl-containing polyester resins, polyurethane resins and acrylic resins together with customary curing agents. Combinations of resins are also used. For instance, epoxy resins are frequently used in combination with carboxyl- and hydroxyl-containing polyester resins.

The dye mixtures of the invention are also useful as colorants for color filters, for additive as well as subtractive color generation (P. Gregory "Topics in Applied Chemistry: High Technology Applications of Organic Colorants" Plenum Press, New York 1991, page 15-25), and also as colorants in electronic inks for electronic newspapers.

The examples hereinbelow illustrate the invention. Temperatures are in degrees Celsius; parts and percentages are by weight, unless otherwise stated.

Examples of Ink Compositions:

A preferred ink composition according to the invention comprises

| | |
|---|---|
| 0.5–35 parts | of a of formula (I), |
| 65–99.5 parts | of water or a medium including a mixture of water and an organic solvent, an anhydrous organic solvent or a solid having a low melting point and optionally |
| 0–5 parts | of one or more additives. |

A more preferred ink composition according to the invention comprises

| | |
|---|---|
| 1–20 parts | of a of formula (I), |
| 80–99 parts | of water or a medium including a mixture of water and an organic solvent, an anhydrous organic solvent or a solid having a low melting point and optionally |
| 0–5 parts | of one or more additives. |

A particularly preferred ink composition according to the invention comprises

| | |
|---|---|
| 1–5 parts | of a of formula (I), |
| 95–99 parts | of water or a medium including a mixture of water and an organic solvent, an anhydrous organic solvent or a solid having a low melting point and optionally |
| 0–5 parts | of one or more additives. |

A more preferred ink composition according to the invention comprises

| | |
|---|---|
| 0.5–35 parts | of a dye mixtures comprising at least one compound of formula (I) and at least one compound of formula (II), (III), (IV) and/or (V), |
| 65–99.5 parts | of water or a medium including a mixture of water and an organic solvent, an anhydrous organic solvent or a solid having a low melting point and optionally |
| 0–5 parts | of one or more additives. |

A particularly preferred ink composition according to the invention comprises

| | |
|---|---|
| 1–2 parts | of a dye mixtures comprising at least one compound of formula (I) and at least one compound of formula (II), (III), (IV) and/or (V), |
| 80–99 parts | of water or a medium including a mixture of water and an organic solvent, an anhydrous organic solvent or a solid having a low melting point and optionally |
| 0–5 parts | of one or more additives. |

A further preferred ink composition according to the invention comprises

| | |
|---|---|
| 1–5 parts | of a dye mixtures comprising at least one compound of formula (I) and at least one compound of formula (II), (III), (IV) and/or (V), and |
| 95–99 parts | of water or a medium including a mixture of water and an organic solvent, an anhydrous organic solvent or a solid having a low melting point and optionally |
| 0–5 parts | of one or more additives. |

The sum total of all the parts of the above mentioned compositions according to the invention is 100 parts.

The above mentioned composition is preferably prepared by heating the medium to 40° C. and then adding a dye mixtures comprising at least one compound of formula (Ie) and at least one compound of formula (II), (III), (IV) and/or (V), The composition is then cooled down to room temperature.

This ink composition is preferably used for printing papers or papery substrates.

The following Examples further serve to illustrate the invention, without restricting the scope of protection to these Examples. In the Examples all parts and all percentages are by weight, and the temperatures given are in degrees Celsius, unless indicated to the contrary.

EXAMPLE 1 a) Diazotization and Coupling 46 g (0.2 mol) 1-acetylamino-4-aminobenzene-3-sulfonic acid are diazotized indirectly in 300 ml water. The reaction solution is added to a suspension of 63.8 g (0.2 mol) 2-amino-8-hydroxynaphthalin-3,6-disulfonic acid in 500 ml water at 5° C. The pH-value is adjusted to 2.5–4 by adding sodiumacetate-solution. After the termination of this reaction the compound of formula (I)

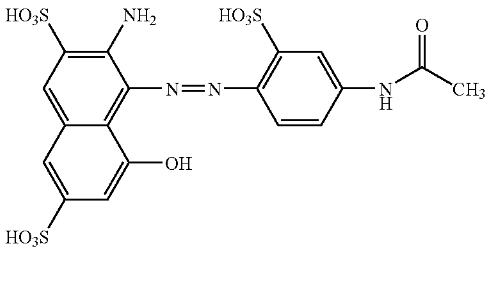

(I)

is filtered off.

b) Isolation

The presscake of a) is washed with brine, until the filtrate becomes clear. After dissolving the presscake in demineralised water of alkalinic pH and desalting by membran filtration, the concetrated solution was dried and the residue milled to powder.

c) Formulation

The powder was dissolved in water at 20° C. to 40° C. and all ingredients were added to obtain the following ink:

| | |
|---|---|
| 2.5 wt % | of dyestuff I |
| 15 wt % | of N-methyl-2-pyrrolidone |
| 82.5 wt % | of water |

The ink of example 1 comprising the dyestuff (I) was filtered by micro-filtration (having 0.45 micrometer pores) and was ready to use for ink jet printing.

The following formulations are used for printing materials as described above. Such compositions were made by the same procedure as described in example 1) part c) but by using the dyestuff (I) previously purified by the method of described in example 1) part c) and further ingredients as indicated in the following examples:

EXAMPLE 2

| | |
|---|---|
| 2.5 wt % | of dyestuff I |
| 15 wt % | of diethylenglycol |
| 82.5 wt % | of water |

EXAMPLE 3

| | |
|---|---|
| 2.5 wt % | of dyestuff I |
| 10 wt % | of diethylenglycol |
| 5 wt % | of N-methyl-2-pyrrolidone |
| 82.5 wt % | of water |

EXAMPLE 4

| | |
|---|---|
| 2.5 wt % | of dyestuff I |
| 10 wt % | of thiodiglycol |
| 5 wt % | of N-methyl-2-pyrrolidone |
| 82.5 wt % | of water |

EXAMPLE 5

| | |
|---|---|
| 2.5 wt % | of dyestuff I |
| 5 wt % | of glycerol |
| 5 wt % | of diethylenglycol |
| 2 wt % | of triethanolamine |
| 85.5 wt % | of water |

EXAMPLE 6

| | |
|---|---|
| 2.5 wt % | of dyestuff I |
| 10 wt % | of diethylenglycol |
| 1 wt % | of Emulgen 66 |
| 86.5 wt % | of water |

EXAMPLE 7

| | |
|---|---|
| 2.5 wt % | of dyestuff I |
| 10 wt % | of diethylenglycol |
| 3 wt % | of diethylenglycol-mono-n-butylether |
| 84.5 wt % | of water |

Dyestuff Mixtures 90 wt-% of the compound of formula (I)

(I)

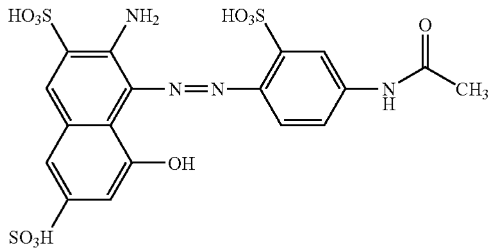

and 10 wt-% of C.I. Acid Red 52. The dyestuffs used were previously purified by desalting by membran filtration. The inks of the following Examples 8 to 12 were made by the same procedure as described in example 1) part c) but using the further ingredients as indicated in the following examples:

EXAMPLE 8

| | |
|---|---|
| 2.5 wt-% | of dyestuff Mixture 1 |
| 15 wt-% | of N-methyl-2-pyrrolidone |
| 82.5 wt-% | of water. |

EXAMPLE 9

| | |
|---|---|
| 2.5 wt-% | of dyestuff Mixture 1 |
| 20 wt-% | of 1,2 propyleneglycol |
| 77.5 wt-% | of water. |

EXAMPLE 10

| | |
|---|---|
| 2.5 wt % | of dyestuff mixture 1 |
| 8 wt % | of diethylenglycol |
| 5 wt % | of glycerol |
| 1 wt % | of Emulgen 66 |
| 83.5 wt % | of water |

EXAMPLE 11

| | |
|---|---|
| 2.5 wt % | of dyestuff mixture 1 |
| 5 wt % | of diethylenglycolamine |
| 5 wt % | of glycerol |
| 87.5 wt % | of water |

EXAMPLE 12

| | |
|---|---|
| 2.5 wt % | of dyestuff mixture 1 |
| 10 wt % | of thiodiglycol |
| 5 wt % | of diethylenglycol |
| 82.5 wt % | of water |

Purrified dyestuff were milled to powder mixed to the following ratios as indicated in the dyestuff-mixtures 2–17.

TABLE 1

(dyestuff-mixtures 2–17)

| Mix. | Compound 1 | wt-% of Compound 1 | Compound 2 | wt-% of Compound 2 |
|---|---|---|---|---|
| 2 | Compound of formula (I) | 95 | C.I. Acid Red 52 | 5 |
| 3 | Compound of formula (I) | 80 | C.I. Acid Red 52 | 20 |
| 4 | Compound of formula I | 70 | C.I. Acid Red 52 | 30 |
| 5 | Compound of formula (I) | 95 | C.I. Acid Red 289 | 5 |
| 6 | Compound of formula (I) | 80 | C.I. Acid Red 289 | 20 |
| 7 | Compound of formula (I) | 70 | C.I. Acid Red 289 | 30 |
| 8 | Compound of formula (I) | 95 | C.I. Acid Red 1 | 5 |
| 9 | Compound of formula (I) | 85 | C.I. Acid Red 1 | 15 |
| 10 | Compound of formula (I) | 95 | C.I. Acid Red 60 | 5 |
| 11 | Compound of formula (I) | 85 | C.I. Acid Red 60 | 15 |
| 12 | Compound of formula (I) | 95 | C.I. Acid Red 30 | 5 |
| 13 | Compound of formula (I) | 90 | C.I. Acid Red 30 | 10 |
| 14 | Compound of formula (I) | 80 | C.I. Acid Red 30 | 20 |
| 15 | Compound of formula (I) | 95 | C.I. Acid Red 37 | 5 |
| 16 | Compound of formula (I) | 90 | C.I. Acid Red 37 | 10 |
| 17 | Compound of formula (I) | 80 | C.I. Acid Red 37 | 20 |

The inks of the following Examples 13 to 42 were made by the same procedure as described in example 1) part c) but using the further ingredients as:

EXAMPLE 13

| | |
|---|---|
| 2.5 wt % | of dyestuff mixture 2 |
| 10 wt % | of diethylenglycol |
| 5 wt % | of 1-propanol |
| 82.5 wt % | of water |

EXAMPLE 14

| | |
|---|---|
| 2.5 wt % | of dyestuff mixture 2 |
| 8 wt % | of diethylenglycol |
| 4 wt % | of diethylenglycol-mono-n-butylether |
| 3 wt % | of 1-propanol |
| 82.5 wt % | of water |

EXAMPLE 15

| | |
|---|---|
| 2.5 wt % | of dyestuff mixture 2 |
| 10 wt % | of ethylenglycol |
| 5 wt % | of N-methyl-2-pyrrolidon |
| 82.5 wt % | of water |

EXAMPLE 16

| | |
|---|---|
| 2.5 wt % | of dyestuff mixture 3 |
| 15 wt % | of polyethoxylated-(9)-triethanolamine |
| 82.5 wt % | of water |

EXAMPLE 17

| | |
|---|---|
| 2.5 wt % | of dyestuff mixture 3 |
| 15 wt % | of diethylenglycol |
| 82.5 wt % | of water |

EXAMPLE 18

| | |
|---|---|
| 2.5 wt % | of dyestuff mixture 3 |
| 10 wt % | of diethylenglycol |
| 1 wt % | of Emulgen 66 |
| 86.5 wt % | of water |

EXAMPLE 19

| | |
|---|---|
| 2.5 wt % | of dyestuff mixture 4 |
| 15 wt % | of polyethoxylated-(6)-triethanolamine |
| 82.5 wt % | of water |

EXAMPLE 20

| | |
|---|---|
| 2.5 wt % | of dyestuff mixture 4 |
| 10 wt % | of thiodiglycol |
| 5 wt % | of diethylenglycol |
| 82.5 wt % | of water |

EXAMPLE 21

| | |
|---|---|
| 2.5 wt % | of dyestuff mixture 4 |
| 10 wt % | of triethylenglycol |
| 5 wt % | of 1-propanol |
| 82.5 wt % | of water |

EXAMPLE 22

| | |
|---|---|
| 2.5 wt % | of dyestuff mixture 4 |
| 10 wt % | of 1,5-pentanediol |
| 5 wt % | of diethylenglycol |
| 82.5 wt % | of water |

EXAMPLE 23

| | |
|---|---|
| 2.5 wt % | of dyestuff mixture 5 |
| 15 wt % | of 2-[2-(2-methoxyethoxy)ethoxy]-ethanol |
| 82.5 wt % | of water |

EXAMPLE 24

| | |
|---|---|
| 2.5 wt % | of dyestuff mixture 5 |
| 15 wt % | of N-(2-hydroxy)ethyl-2-pyrrolidon |
| 82.5 wt % | of water |

EXAMPLE 25

| | |
|---|---|
| 2.5 wt % | of dyestuff mixture 5 |
| 10 wt % | of 2-diethylamino-1-ethanol |

-continued

| | |
|---|---|
| 5 wt % | of o,o-bis-(2-aminopropyl)-polyethylenglycol 500 |
| 82.5 wt % | of water |

EXAMPLE 26

| | |
|---|---|
| 2.5 wt % | of dyestuff mixture 6 |
| 15 wt % | of diethylenglycol |
| 82.5 wt % | of water |

EXAMPLE 27

| | |
|---|---|
| 2.5 wt % | of dyestuff mixture 6 |
| 10 wt % | of N-ethyl-2-pyrrolidone |
| 3 wt % | of triethanolamine |
| 84.5 wt % | of water |

EXAMPLE 28

| | |
|---|---|
| 2.5 wt % | of dyestuff mixture 6 |
| 10 wt % | of o-(2-aminoethyl)-polyethylenglycol 750 |
| 5 wt % | of thiodiglycol |
| 82.5 wt % | of water |

EXAMPLE 29

| | |
|---|---|
| 2.5 wt % | of dyestuff mixture 6 |
| 10 wt % | of 3-dimethylamine-1-propanol |
| 5 wt % | of glycerol |
| 82.5 wt % | of water |

EXAMPLE 30

| | |
|---|---|
| 2.5 wt % | of dyestuff mixture 7 |
| 10 wt % | of N-methyl-2-pyrrolidon |
| 1 wt % | of Emulgen 66 |
| 86.5 wt % | of water |

EXAMPLE 31

| | |
|---|---|
| 2.5 wt % | of dyestuff mixture 7 |
| 10 wt % | of diethylenglycol |

-continued

| | |
|---|---|
| 1 wt % | of Emulgen 66 |
| 86.5 wt % | of water |

EXAMPLE 32

| | |
|---|---|
| 2.5 wt % | of dyestuff mixture 7 |
| 10 wt % | of diethylenglycol |
| 5 wt % | of cyclohexanol |
| 82.5 wt % | of water |

EXAMPLE 33

| | |
|---|---|
| 2.5 wt % | of dyestuff mixture 8 |
| 10 wt % | of diethylenglycol |
| 5 wt % | of polyoxyethylen-(9)-triethanolamin |
| 82.5 wt % | of water |

EXAMPLE 34

| | |
|---|---|
| 2.5 wt % | of dyestuff mixture 9 |
| 10 wt % | of 1,5-pentanediol |
| 5 wt % | of glycerol |
| 82.5 wt % | of water |

EXAMPLE 35

| | |
|---|---|
| 2.5 wt % | of dyestuff mixture 10 |
| 10 wt % | of triethanolamine |
| 1 wt % | of Emulgen 66 |
| 86.5 wt % | of water |

EXAMPLE 36

| | |
|---|---|
| 2.5 wt % | of dyestuff mixture 11 |
| 10 wt % | of diethylenglycol |
| 5 wt % | of o,o-bis-(3-aminopropyl)-polyethylenglycol 1500 |
| 82.5 wt % | of water |

EXAMPLE 37

| | |
|---|---|
| 2.5 wt % | of dyestuff mixture 12 |
| 10 wt % | of Polyoxyethylen-(6)-triethanolamine |

-continued

| | |
|---|---|
| 5 wt % | of 1-Propanol |
| 82.5 wt % | of water |

EXAMPLE 38

| | |
|---|---|
| 2.5 wt % | of dyestuff mixture 13 |
| 15 wt % | of diethylenglycol |
| 82.5 wt % | of water |

EXAMPLE 39

| | |
|---|---|
| 2.5 wt % | of dyestuff mixture 14 |
| 10 wt % | of diethylenglycol |
| 1 wt % | of Emulgen 66 |
| 86.5 wt % | of water |

EXAMPLE 40

| | |
|---|---|
| 2.5 wt % | of dyestuff mixture 15 |
| 15 wt % | of 3-diethylamine-1-propanol |
| 82.5 wt % | of water |

EXAMPLE 41

| | |
|---|---|
| 2.5 wt % | of dyestuff mixture 16 |
| 10 wt % | of thiodiglycol |
| 5 wt % | of diethylenglycol |
| 82.5 wt % | of water |

EXAMPLE 42

| | |
|---|---|
| 2.5 wt % | of dyestuff mixture 17 |
| 10 wt % | of 2-(2-diethylaminoethoxy)-ethanol |
| 5 wt % | of diethylenglycol |
| 82.5 wt % | of water |

APPLICATION EXAMPLES

An ink as indicated above was introduced into an HP 880C DeskJet Printer and printed onto an A4 HP Premium Inkjet paper (HP and DeskJet are registered trademarks of Hewlett-Packard, Palo Alto, Calif., USA). Different properties of the prints have been tested which results are listed next to the ink compositions (Table 2). In the last coloum (with the asterix $^{(*)}$) the difference of the resulting shade when printed is given relative to the Application Examples A-I to A-III which are magenta.

TABLE 2

(Application examples A-I to A-XXVII)

| Application Example | Ink-preparation | lightfastness | brilliance | waterfastness | difference of shade$^{(*)}$ |
|---|---|---|---|---|---|
| A-I | Example 1 | excellent | excellent | very good | |
| A-II | Example 2 | excellent | excellent | very good | |
| A-III | Example 6 | excellent | excellent | very good | |
| A-IV | Example 8 | very good | excellent | very good | more bluish |
| A-V | Example 10 | very good | excellent | very good | more bluish |
| A-VI | Example 13 | excellent | excellent | very good | more bluish |
| A-VII | Example 15 | excellent | excellent | very good | more bluish |
| A-VIII | Example 16 | good | excellent | very good | more bluish |
| A-IX | Example 18 | good | excellent | very good | more bluish |
| A-X | Example 19 | moderate | excellent | very good | more bluish |
| A-XI | Example 20 | moderate | excellent | very good | more bluish |
| A-XII | Example 23 | excellent | excellent | very good | more bluish |
| A-XIII | Example 24 | excellent | excellent | very good | more bluish |
| A-XIV | Example 28 | good | excellent | very good | more bluish |
| A-XV | Example 29 | good | excellent | very good | more bluish |
| A-XVI | Example 30 | moderate | excellent | very good | more bluish |
| A-XVII | Example 32 | moderate | excellent | very good | more bluish |
| A-XVIII | Example 33 | excellent | good | very good | more bluish |
| A-XIX | Example 34 | very good | good | very good | more bluish |
| A-XX | Example 35 | very good | good | very good | more bluish |
| A-XXI | Example 36 | good | good | very good | more bluish |
| A-XXII | Example 37 | very good | good | very good | more yellowish |
| A-XXIII | Example 38 | very good | good | very good | more yellowish |
| A-XXIV | Example 39 | very good | good | very good | more yellowish |
| A-XXV | Example 40 | excellent | good | very good | more yellowish |

TABLE 2-continued (Application examples A-I to A-XXVII)

| Application Example | Ink-preparation | lightfastness | brilliance | waterfastness | difference of shade(*) |
|---|---|---|---|---|---|
| A-XXVI | Example 41 | excellent | good | very good | more yellowish |
| A-XXVII | Example 42 | excellent | good | very good | more yellowish |

The invention claimed is:

1. A dyestuff mixture comprising at least one compound of formula (I)

(I)

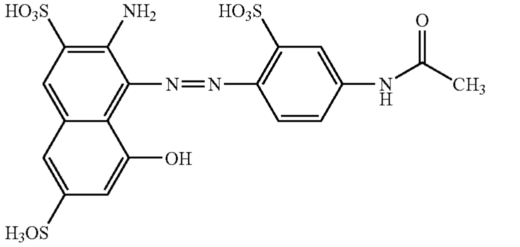

as free acid or in salt form and at least one compound selected from the group consisting of formula (II), formula (III), formula (IV), and formula (V) wherein the compound of formula (II) is (II)

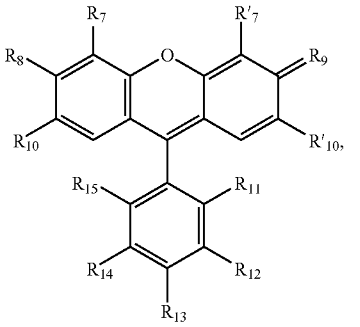

wherein $R_7$ and $R'_7$ are independently from each other H or halogen, $R_8$ is —OH or $NR_{16}R_{17}$, wherein $R_{16}$ is H; unsubstituted $C_{1-4}$alkyl; substituted $C_{1-4}$alkyl; unsubstituted phenyl or a substituted phenyl, $R_{17}$ is unsubstituted $C_{1-4}$alkyl; substituted $C_{1-4}$alkyl; unsubstituted phenyl or a substituted phenyl, $R_9$ is O or $NR_{17}$, wherein $R_{17}$ has the same meaning as defined above, $R_{10}$ and $R'_{10}$ are independently from each other H; halogen; unsubstituted $C_{1-2}$alkyl or —$NO_2$, $R_{11}$ is —$SO_3H$ or —COOH, $R_{12}$ is H or halogen, $R_{13}$ is H; —$SO_3H$ or halogen $R_{14}$ is H or halogen, $R_{15}$ is H or halogen, wherein the compound of formula (III) is (III)

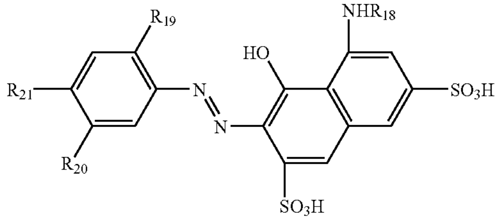

wherein $R_{16}$ is H;

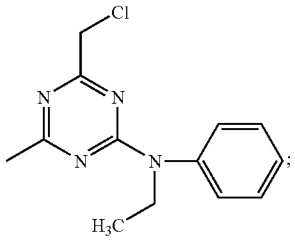

—$COC_{1-2}$alkyl; —$CO(CH_2O)_n$—$R_{22}$; or —$SO_2R_{22}$, wherein $R_{22}$ is an unsubstituted phenyl or a phenyl moiety, which is substituted by at least one substituent selected from the group consisting of —$CH_3$ and halogen, n is 0 or 1, $R_{19}$ is H; —$CH_3$; —$SO_3H$ or —$OR_{23}$, wherein $R_{23}$ is —$CH_3$; unsubstituted phenyl; substituted phenyl or benzyl $R_{20}$ is H; halogen; $C_{1-10}$alkyl or —$NHCOCHBrCH_2Br$ $R_{21}$ is H; —$NO_2$; $C_{1-15}$alkyl or $C_{5-7}$cycloalkyl;

wherein the compound of formula (IV) is (IV)

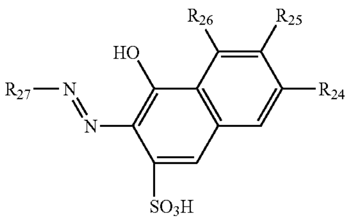

wherein $R_{24}$ is H or —$SO_3H$, $R_{25}$ is H; —$NHCOC_{1-2}$alkyl or —OH, $R_{26}$ is H or —OH;

$R_{27}$ is

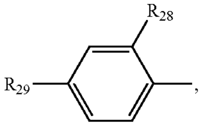

wherein $R_{28}$ is H or unsubstituted phenyl, $R_{29}$ is H; —COH; —$NO_2$;

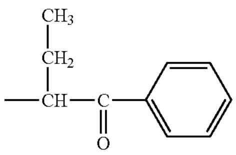

or

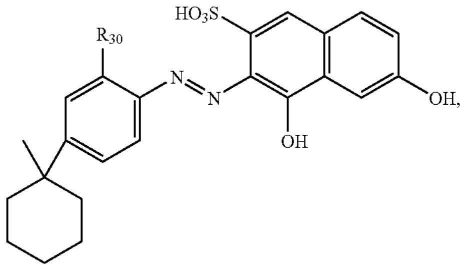

wherein $R_{30}$ is H or —$CH_3$, or $R_{27}$ is

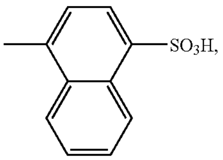

wherein the compound of formula (V) is (V)

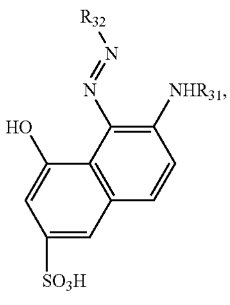

wherein $R_{31}$ is H or

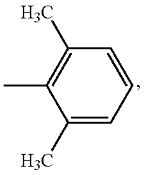

$R_{32}$ is

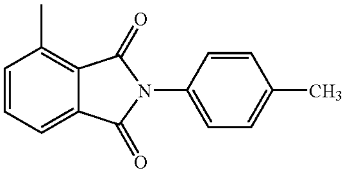

or

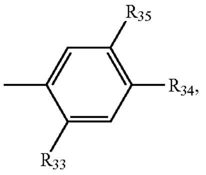

wherein $R_{33}$ is H; —$SO_3H$; —$CF_3$; —Cl; —$COOC_{1-2}$alkyl; or —$SO_2R_{36}$, wherein $R_{36}$ is unsubstituted phenyl; substituted phenyl; O-phenyl; —NH—$C_{1-12}$alkyl; —N($C_{1-6}$alkyl)$_2$; unsubstituted $C_{5-8}$cycloalkyl; substituted $C_{5-8}$cycloalkyl; $C_{5-8}$cycloalkyl with at least one N, O or S atom incorporated into the ring;

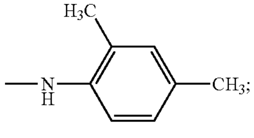

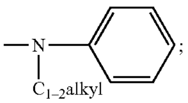

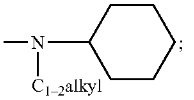

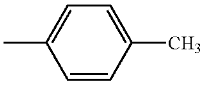

or

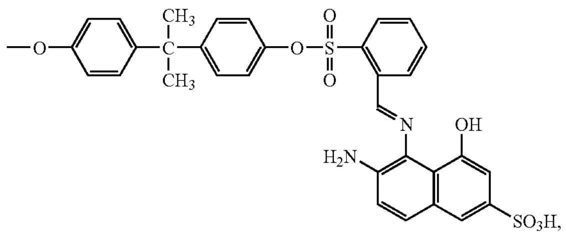

$R_{34}$ is H; —$NHCOC_{1-4}$alkyl; —NHCOphenyl, wherein the phenyl ring is unsubstituted or substituted; —N($C_{1-2}$alkyl)$COC_{1-4}$alkyl; —N($C_{1-2}$alkyl)COphenyl, wherein the phenyl ring is unsubstituted or substituted; unsubstituted phenyl; substituted phenyl; O-phenyl, wherein the phenyl is unsubstituted or substituted; halogen; —$SO_3H$; —$NHCOOC_{1-2}$alkyl; —$NHCOOC_{5-7}$cycloalkyl, wherein the cycloalkyl is substituted or unsubstituted and —$SO_2$NHphenyl, wherein the phenyl ring is unsubstituted or substituted, $R_{35}$ is H; —$NHCOC_{1-4}$alkyl; —NHCOphenyl, wherein the phenyl ring is unsubstituted or substituted; —N($C_{1-2}$alkyl)$COC_{1-4}$alkyl; —N($C_{1-2}$alkyl)COphenyl, wherein the phenyl ring is unsubstituted or substituted; unsubstituted phenyl; substituted phenyl; O-phenyl, wherein the phenyl is unsubstituted or substituted; halogen; —Cl; —$CH_3$; —$COOC_{1-4}$alkyl and —$SO_2$NHphenyl, wherein the phenyl ring is unsubstituted or substituted.

2. The composition according to claim 1 wherein the compound according to formula (II) is selected from the group consisting of C.I. (Colour Index) Acid Red 50, C.I. Acid Red 51, C.I. Acid Red 52, C.I. Acid Red 87, C.I. Acid Red 91, C.I. Acid Red 92, C.I. Acid Red 93, C.I. Acid Red 94, C.I. Acid Red 95, C.I. Acid Red 98, C.I. Acid Red 289 Acid Violet 9 and C.I. Acid Violet 30.

3. The composition according to claim 1, wherein the compound of formula (II) Is Acid Red 52 or C.I. Acid Red 289.

4. A recording fluid comprising a dye mixture according to claim 1.

5. A recording fluid as claimed in claim 4, wherein the dye mixture is in desalted form.

6. A recording fluid as claimed in claim 4, wherein the recording fluid is an ink-jet ink.

7. A recording fluid according to claim 4, further comprising water or a medium including a mixture of water and an organic solvent, an anhydrous organic solvent or a solid having a low melting point.

8. An electrophotographic toner comprising a dyestuff mixture according to claim 1.

9. A method for dyeing or printing natural or synthetic fiber materials, for recording script and images on recording media, or for coloring paper or cellulose in the pulp, comprising the step of adding a dye mixture according to the claim 1 to said fiber material, recording media or pulp.

10. An inkjet printing composition for printing recording materials comprising 1) the dye of formula (I)

(I)

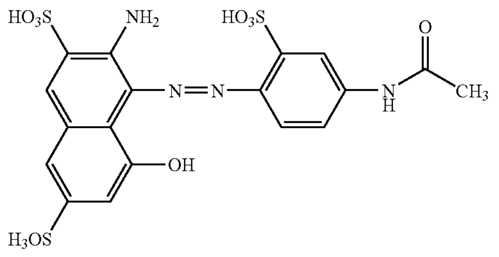

and 2) water or a medium including a mixture of water and an organic solvent, an anhydrous organic solvent or a solid having a low melting point.

11. A printing method for printing a substrate with a printing ink comprising the step of adding to the printing ink a compound of formula (I)

(I)

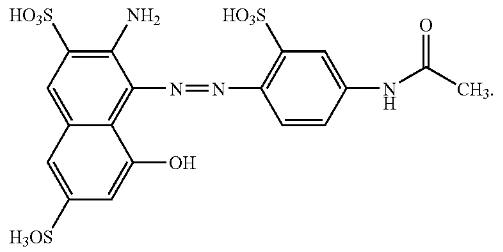

12. The composition according to claim 1 wherein the compound according to formula (III) is selected from the group consisting of C.I. Acid Red 1, C.I. Acid Red 33, C.I. Acid Red 35, C.I. Acid Red 40, C.I. Acid Red 76, C.I. Acid Red 106, C.I. Acid Red 138, C.I. Acid Red 155, C.I. Acid Red 160, C.I. Acid Red 172, C.I. Acid Red 249, C.I. Acid Red 264 and C.I. Acid Red 265.

13. The composition according to claim 1 wherein the compound according to formula (IV) is selected from the group consisting of C.I. Acid Red 15, C.I. Acid Red 19, C.I. Acid Red 29, C.I. Acid Red 60, C.I. Acid Red 68, C.I. Acid Red 154 and C.I. Acid Red 176.

14. The composition according to claim 1, wherein the compound according to formula (V) is selected from the group consisting of C.I. Acid Red 30, C.I. Acid Red 34, C.I. Acid Red 37, C.I. Acid Red 42, C.I. Acid Red 54, C.I. Acid Red 57, C.I. Acid Red 231, C.I. Acid Red 266, C.I. Acid Red 301 and C.I. Acid Red 337.

15. The method of claim 11, wherein the printing method is ink jet printing or electrophotographic printing.

* * * * *